United States Patent
Chen et al.

(10) Patent No.: US 9,152,242 B2
(45) Date of Patent: Oct. 6, 2015

(54) OPTICAL NAVIGATOR DEVICE AND ITS TRANSMISSION INTERFACE INCLUDING QUICK BURST MOTION READOUT MECHANISM

(71) Applicant: Pixart Imaging Inc., Hsin-Chu (TW)

(72) Inventors: Chun Wei Chen, Hsinchu (TW); Yung Chang Lin, Hsinchu (TW)

(73) Assignee: Pixart Imaging Inc., Hsin-chu (TW)

( * ) Notice: Subject to any disclaimer, the term of this patent is extended or adjusted under 35 U.S.C. 154(b) by 226 days.

(21) Appl. No.: 13/677,018

(22) Filed: Nov. 14, 2012

(65) Prior Publication Data

US 2013/0127720 A1     May 23, 2013

(30) Foreign Application Priority Data

Nov. 22, 2011  (TW) .............................. 100142672 A (51) Int. Cl.
*G06F 3/033* (2013.01)
*G06F 3/03* (2006.01)
*G06F 3/038* (2013.01)

(52) U.S. Cl.
CPC .............. *G06F 3/0304* (2013.01); *G06F 3/033* (2013.01); *G06F 3/0317* (2013.01); *G06F 3/0383* (2013.01)

(58) Field of Classification Search
None
See application file for complete search history.

(56) References Cited

U.S. PATENT DOCUMENTS

| 5,880,745 | A  | * | 3/1999  | Miichi     | 345/520 |
|-----------|----|---|---------|------------|---------|
| 2010/0207883 | A1 | * | 8/2010  | Wang et al. | 345/163 |
| 2010/0281184 | A1 | * | 11/2010 | Chang      | 710/13  |
| 2010/0328216 | A1 | * | 12/2010 | Honda et al. | 345/163 |
| 2011/0298713 | A1 | * | 12/2011 | Wu         | 345/163 |

* cited by examiner

*Primary Examiner* — Adam R Giesy
*Assistant Examiner* — Henok Heyi
(74) *Attorney, Agent, or Firm* — Juan Carlos A. Marquez; Bacon & Thomas PLLC (57) ABSTRACT

A transmission interface has a quick burst motion readout mechanism and is configured to be used between a master device and a slave device. The transmission interface includes a trigger channel configured to allow the master device to transmit a trigger signal to the slave device before transmission of data, and includes a data transmission channel provided to the slave device to transmit readable data to the master device after the slave device receives the trigger signal. The master and slave devices are adapted to a predetermined data transmission protocol by which the readable data can be directly transmitted and not accompanied by address data related to the readable data.

12 Claims, 10 Drawing Sheets

OPTICAL NAVIGATOR DEVICE AND ITS TRANSMISSION INTERFACE INCLUDING QUICK BURST MOTION READOUT MECHANISM

CROSS-REFERENCE TO RELATED APPLICATION

The present application is based on, and claims priority from, Taiwan Patent Application Serial Number 100142672, filed on Nov. 22, 2012, the disclosure of which is hereby incorporated by reference herein in its entirety.

BACKGROUND

1. Technical Field

The present invention relates to a transmission interface and a device comprising the same, and relates more particularly to a transmission interface having a quick burst motion readout mechanism and a device comprising the same.

2. Related Art

Figure 1:
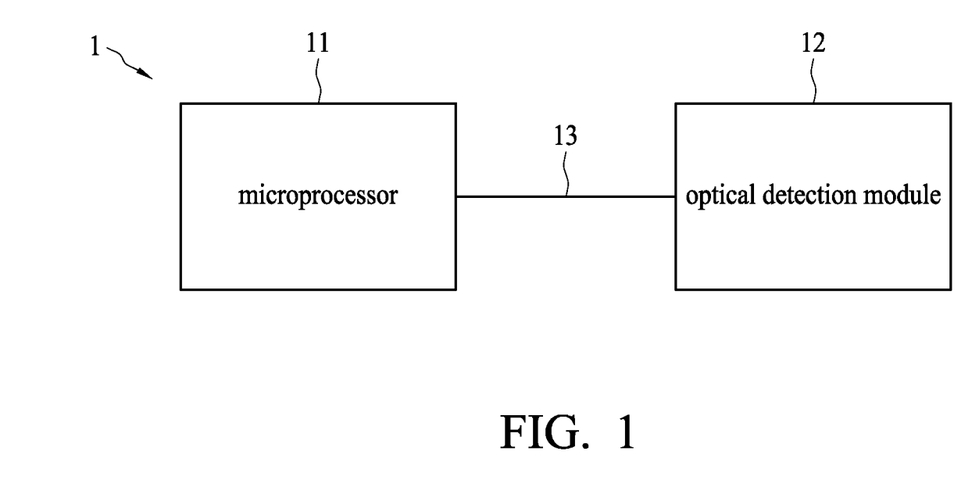
FIG. 1 schematically shows a conventional optical mouse.

Optical mice determine their movement relative to the tracking surface underneath them by using a light source and an image sensor. FIG. 1 schematically shows a conventional optical mouse. As shown in FIG. 1, a conventional optical mouse comprises a microprocessor 11 and an optical detection module 12 connected with the microprocessor 11 using a serial peripheral interface bus 13. Generally, the serial peripheral interface bus 13 is a four wire serial bus or a two wire serial bus. The microprocessor 11 can acquire displacement data generated by the optical detection module 12 via the serial peripheral interface bus 13.

Figure 2:
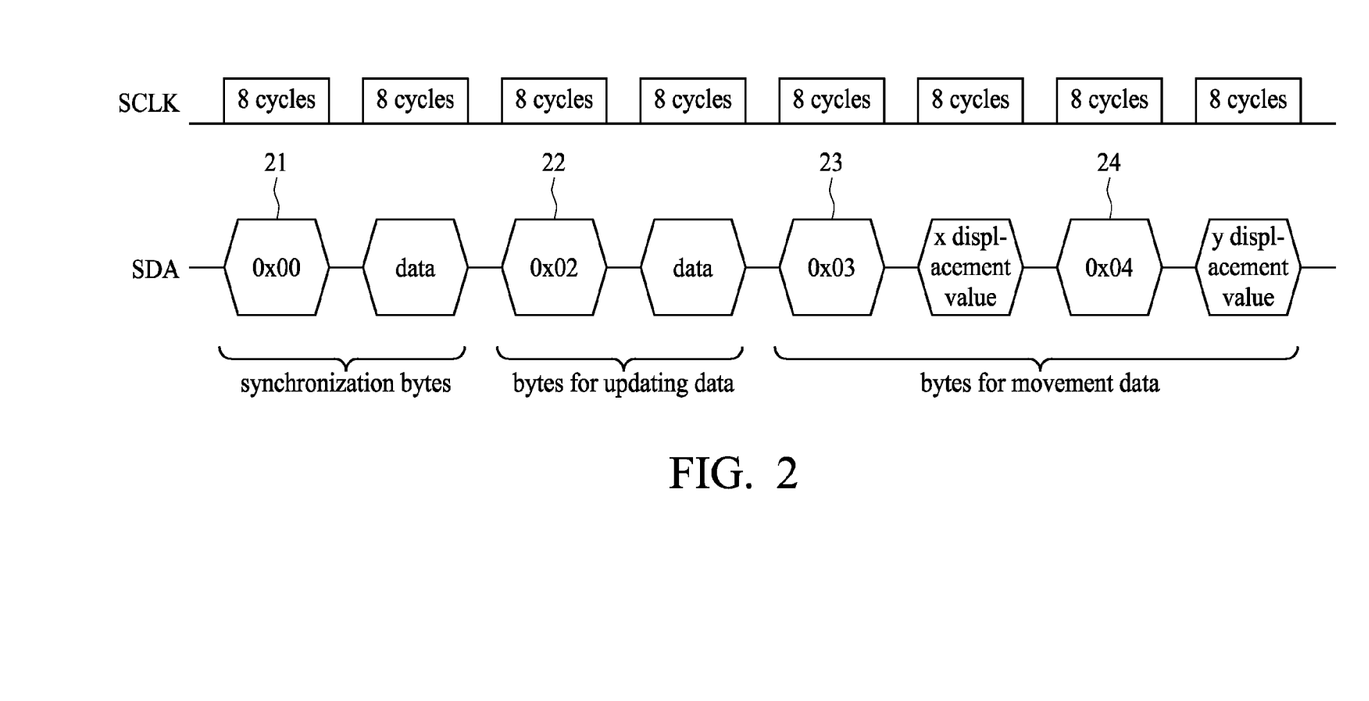
FIG. 2 is a schematic timing diagram where a read operation takes place on a serial peripheral interface bus, which is a two wire serial bus.

FIG. 2 is a schematic timing diagram where a read operation takes place on a serial peripheral interface bus, which is a two wire serial bus. When the serial peripheral interface bus 13 is a two wire serial bus, the serial peripheral interface bus 13 may have a SCLK (serial clock) line and a SDA (serial data) line. The microprocessor 11 and the optical detection module 12 may be configured to mutually transmit eight byte data. The microprocessor 11 provides clock signals via the SCLK line. Every time, the microprocessor 11 reads displacement data (eight byte data), which includes two synchronization bytes, two bytes for updating data, and four bytes of displacement data, wherein the two synchronization bytes and the two bytes for updating data both have to include address data 21 and 22, which includes address data 23 related to an x displacement value and address data 24 related to a y displacement value. When the transmission rate is 200 kHz, it takes 355 microseconds for complete transmission of 8 bytes of data. Although the two wire serial bus uses less input and output ports and is cheaper, it takes a longer time to transmit displacement data and cannot ensure that the displacement data is transmitted in synchronization.

Figure 3:
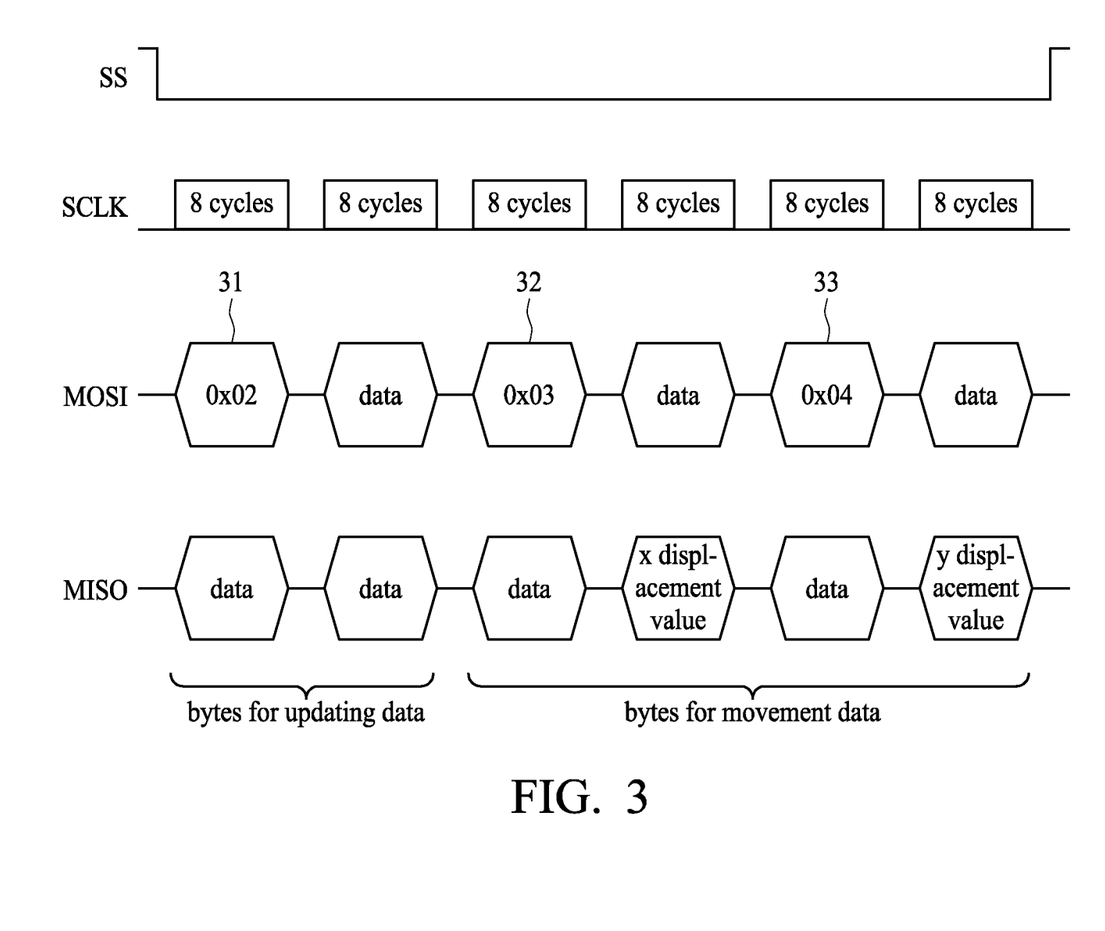
FIG. 3 is a schematic timing diagram where a read operation takes place on a serial peripheral interface bus, which is a four wire serial bus.

FIG. 3 is a schematic timing diagram where a read operation takes place on a serial peripheral interface bus, which is a four wire serial bus. When the serial peripheral interface bus 13 is a four wire serial bus, the serial peripheral interface bus 13 may comprise a SCLK (serial clock) line, a MOSI (master output slave input) line, a MISO (master input slave output) line, and a SS (slave select) line. Every time the microprocessor 11 reads displacement data, the microprocessor 11 sets the SS line to a low logic level, issues clock signals via the SCLK line, sends address data (31, 32 and 33) and data to the optical detection module 12 via the MOSI line, and receives update data, x displacement data and y displacement data from the optical detection module 12 via the MISO line. Because there is no requirement of transmitting synchronization data, the transmission time is shorter. For example, if the transmission rate is 200 kHz and the guide time is 5 microseconds, it takes 265 microseconds for complete transmission of eight bytes of data. The four wire serial bus uses more input and output ports, is more expansive, and still spends a long time to transmit data.

SUMMARY

One embodiment of the present invention provides a transmission interface having a quick burst motion readout mechanism. The transmission interface is configured to be applied between a master device and a slave device. The transmission interface comprises a trigger channel and a data transmission channel. The trigger channel is configured to allow the master device to transmit a trigger signal to the slave device before transmission of data. The data transmission channel is configured to allow the slave device to transmit readable data to the master device after the slave device receives the trigger signal. The master and slave devices are adapted to a predetermined data transmission protocol by which the readable data is directly transmitted and not accompanied by address data related to the readable data.

Another embodiment of the present invention discloses a transmission interface having a quick burst motion readout mechanism. The transmission interface is configured to be applied between a master device and a slave device. The transmission interface comprises a data transmission channel and a clock channel. The slave device is configured to be triggered to send readable data to the master device via the data transmission channel when the clock channel is set at a signal level and a signal level of the data transmission channel is changed. The master device and the slave device are adapted to a predetermined data transmission protocol, by which the readable data is directly transmitted and not accompanied by address data related to the readable data.

One embodiment of the present invention discloses an optical navigation device comprising an image pixel array, a transmission interface, and a processor. The image pixel array is configured to capture images. The transmission interface is configured to communicate with a computer and comprises a data transmission channel. The processor is coupled with the image pixel array and the transmission interface, and configured to continuously generate displacement data. The processor is configured to send out the displacement data via the data transmission channel when the processor is triggered.

One embodiment of the present invention discloses a quick burst motion readout mechanism that uses less transmission channels or input and output ports for data transmission, and can use less total bytes for transmitting data in a read operation. As a result, the time for transmitting data can be reduced, the use of the input and output ports are less in frequency, and the electrical leakage of the device can be minimized.

To provide a better understanding of the above-described objectives, characteristics and advantages of the present invention, a detailed explanation is provided in the following embodiments with reference to the drawings.

BRIEF DESCRIPTION OF THE DRAWINGS

The invention will be described according to the appended drawings in which.

DETAILED DESCRIPTION OF DISCLOSED EMBODIMENTS

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the disclosed embodiments. Thus, the disclosed embodiments are not limited to the embodiments shown, but are to be accorded the widest scope consistent with the principles and features disclosed herein.

One embodiment of the present invention discloses a quick burst motion readout mechanism, which uses fewer channels or input and output ports for data transmission and can transmit less total bytes in a read operation. As a result, the time for transmitting data can be reduced, the use of the input and output ports are less in frequency, and the electrical leakage of the device can be minimized.

Figure 4:
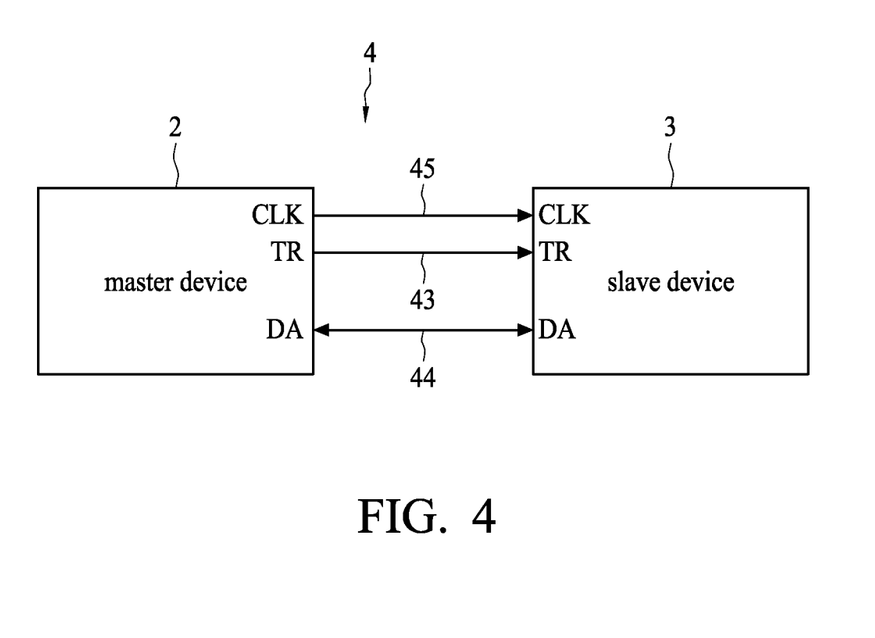
FIG. 4 schematically depicts a transmission interface having a quick burst motion readout mechanism according to one embodiment of the present invention.

Referring to FIG. 4, one embodiment of the present invention discloses a transmission interface 4 having a quick burst motion readout mechanism. The transmission interface 4 can be applied to connect a master device 2 and a slave device 3. The transmission interface 4 may comprise a trigger channel 43 and a data transmission channel 44, wherein the trigger channel 43 connects to the TR ports of the master device 2 and the slave device 3, and the data transmission channel 44 connects to the DA ports of the master device 2 and the slave device 3.

Figure 5:
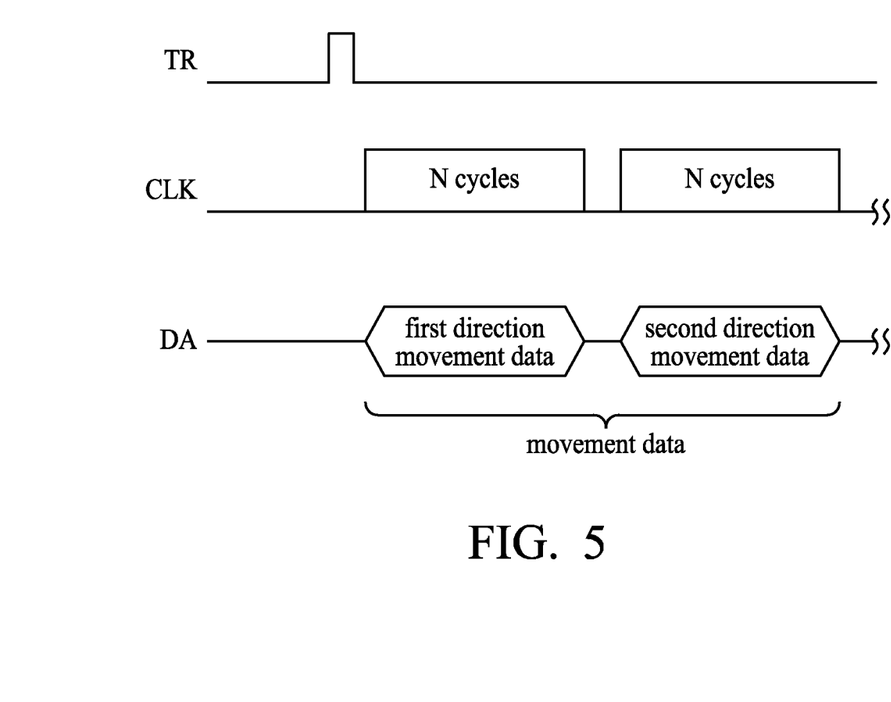
FIG. 5 is a schematic timing diagram where a read operation takes place on a transmission interface having a quick burst motion readout mechanism according to one embodiment of the present invention.

Referring to FIGS. 4 and 5, when a read operation is performed, the master device 2 sends a trigger signal TR to the slave device 3 via the trigger channel 43 before transmission of data, as shown in FIG. 5. The data transmission channel 44 is configured to allow the slave device 3 to transmit readable data DA to the master device 2 after the slave device 3 receives the trigger signal TR. The master device 2 and the slave device 3 are adapted to a predetermined data transmission protocol, by which the readable data DA can be directly transmitted without being accompanied by address data.

Using an additional trigger channel 43 to transmit a trigger signal TR can achieve the synchronization of the master device 2 and the slave device 3. As a result, there is no need to transmit data for achieving synchronization when a read operation is performed; therefore, the total bytes of data sent in a read operation can be reduced. Furthermore, because the readable data DA is transmitted without being accompanied by address data, the total bytes of data sent in a read operation can be further reduced. For example, as shown in FIG. 5, if eight byte data is sent, the transmission rate is 200 kHz, and the guide time is 5 microseconds, it will take 85 microseconds to complete the transmission of the readable data DA to the master device 2. In summary, the quick burst motion readout mechanism of one embodiment of the present invention can significantly reduce the time required by transmitting data and the frequency of the use of input and output ports.

The trigger signal TR can be a low level signal or a high level signal for a specific period of time.

In one embodiment, the transmission interface 4 can be a serial communication interface, but the present invention is not limited to such an embodiment.

In one embodiment, the transmission interface 4 may comprise a SPI (serial peripheral interface) bus, but the present invention is not limited to such an embodiment.

In one embodiment, the transmission interface 4 may comprise an I²C interface, but the present invention is not limited to such an embodiment.

In one embodiment, the trigger signal TR is a predetermined protocol trigger signal or a user-defined trigger signal that both the master device 2 and the slave device 3 can recognize and use for data transmission.

The signal width or the duration of the trigger signal TR can be shorten to the utmost, but still needs to be detectable by the slave device 3. In other words, the signal width or the duration of the trigger signal TR can at least be the smallest pulse width that can be detectable by the slave device 3.

In one embodiment, the transmission interface 4 can further comprise a CLK (clock) channel 45. The master device 2 issues its clock signals via the CLK channel 45, which connects to the CLK ports of the master device 2 and the slave device 3. In one embodiment, the signal width of the clock signal of the master device 2 and the slave device 3 can be the same as the signal width of the trigger signal TR. In one embodiment, the signal width of the clock signal of the master device 2 and the slave device 3 can be different from the signal width of the trigger signal TR. In one embodiment, the signal width of the clock signal of the master device 2 and the slave device 3 can be independently determined from the signal width of the trigger signal TR, and the signal width of the clock signal can be determined according to the system in use. The determination of the clock signal will not affect the application of the present invention. Namely, the signal width of the trigger signal TR and the signal width of the clock signal of the master device 2 and the slave device 3 can be unrelated to each other, and can be separately determined without considering one another. In one embodiment, the signal width of the clock signal of the master device 2 and the slave device 3 is smaller than the signal width of the trigger signal TR.

In one embodiment, the trigger signal TR comprises a hardware trigger signal TR, or comprises an edge trigger signal TR or a level trigger signal TR.

Figure 6:
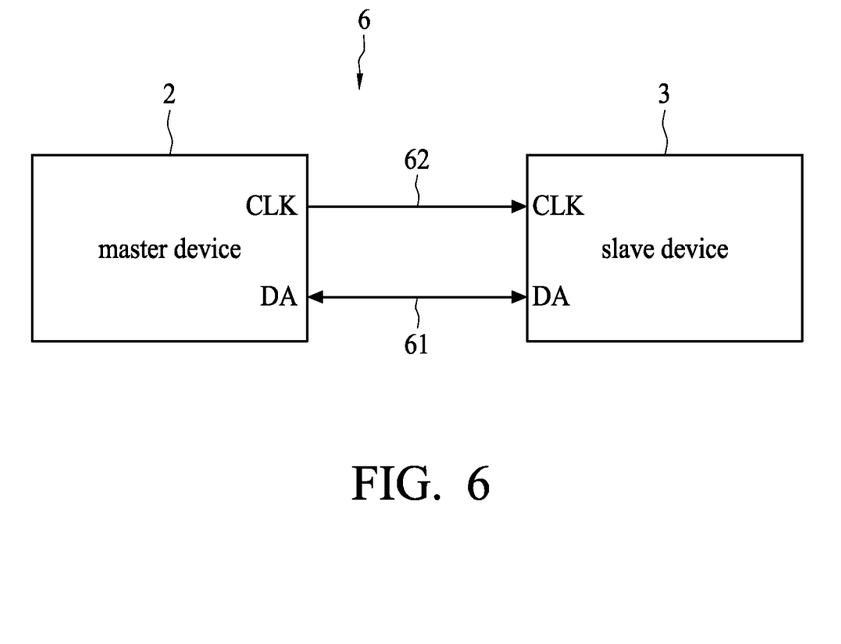
FIG. 6 schematically depicts a transmission interface having a quick burst motion readout mechanism according to another embodiment of the present invention.

FIG. 6 schematically depicts a transmission interface having a quick burst motion readout mechanism according to another embodiment of the present invention. The transmission interface 6 having a quick burst motion readout mechanism in another embodiment of the present invention can be configured to connect a master device 2 and a slave device 3. The transmission interface 6 may comprise a data transmission channel 61 connecting to the DA ports of the master device 2 and the slave device 3, and a clock channel 62 connecting to the CLK ports of the master device 2 and the slave device 3.

The master device 2 can set the clock channel at a signal level and change the signal level of the data transmission channel 61 to trigger the slave device 3 to send readable data DA to the master device 2 via the data transmission channel 61, wherein the master device 2 and the slave device 3 are adapted to a predetermined data transmission protocol, by which the readable data DA can be directly sent without accompanying address data.

Figure 7:
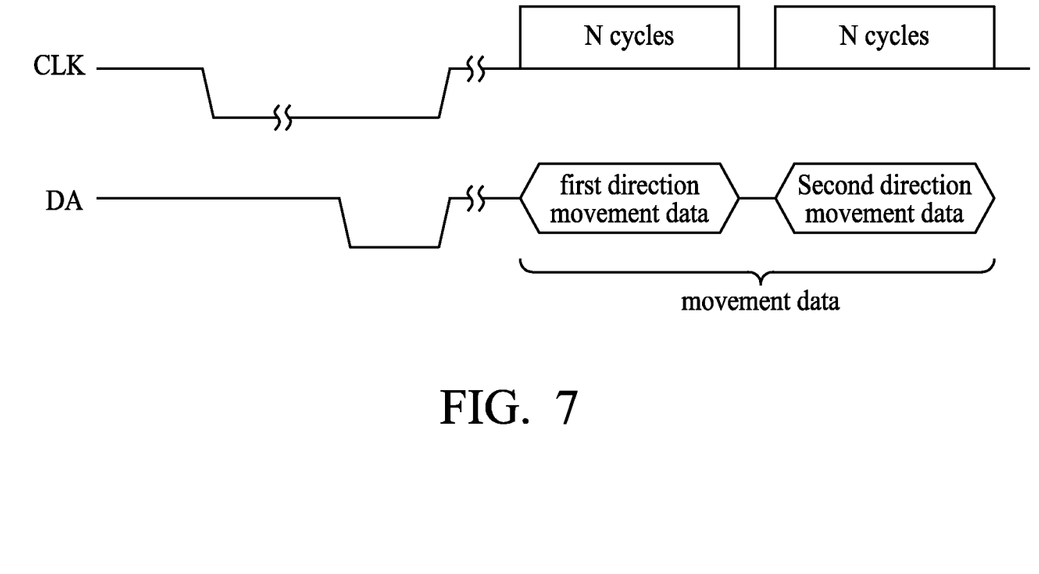
FIG. 7 is a schematic timing diagram where a read operation takes place on a transmission interface having a quick burst motion readout mechanism according to another embodiment of the present invention.

In one embodiment, as shown in FIG. 7, when the master device 2 is going to acquire readable data DA, the CLK port of the master device 2 is set to a low signal level. During the period that the CLK port of the master device 2 is held at the low signal level, the signal level of the DA port of the master device 2 is pulled down. At this moment, the master device 2 and the slave device 3 are synchronized, and the slave device 3 is triggered to send readable data.

In an alternate embodiment, when the CLK port is held at a low signal level, the signal level of the DA port of the master device 2 is pulled up. At this moment, the slave device 3 is triggered to send readable data.

In other embodiments, when the CLK port is held at a high signal level, the signal level of the DA port of the master device 2 is changed. At this moment, the slave device 3 is triggered to send readable data.

Without requiring an additional trigger channel and relevant ports, the cost can be reduced. Because readable data is transmitted without accompanying address data, the total bytes of transmission data can be reduced. Consequently, the time for transmitting data can be reduced and the use of the input and output ports are less in frequency.

In one embodiment, the slave device 3 can be triggered by directly setting the CLK port at a predetermined signal level for a period of time, wherein the period of time is longer than the signal width of the clock signal. The slave device 3 may comprise a counter. When the CLK port is set at a predetermined signal level, the counter starts counting. If the counting value meets a predetermined counting value, then readable data is sent.

The transmission interface having a quick burst motion readout mechanism can be applied to many electronic products, and is not limited to the optical navigation device below, which is used as an example to illustrate the present invention.

Figure 8:
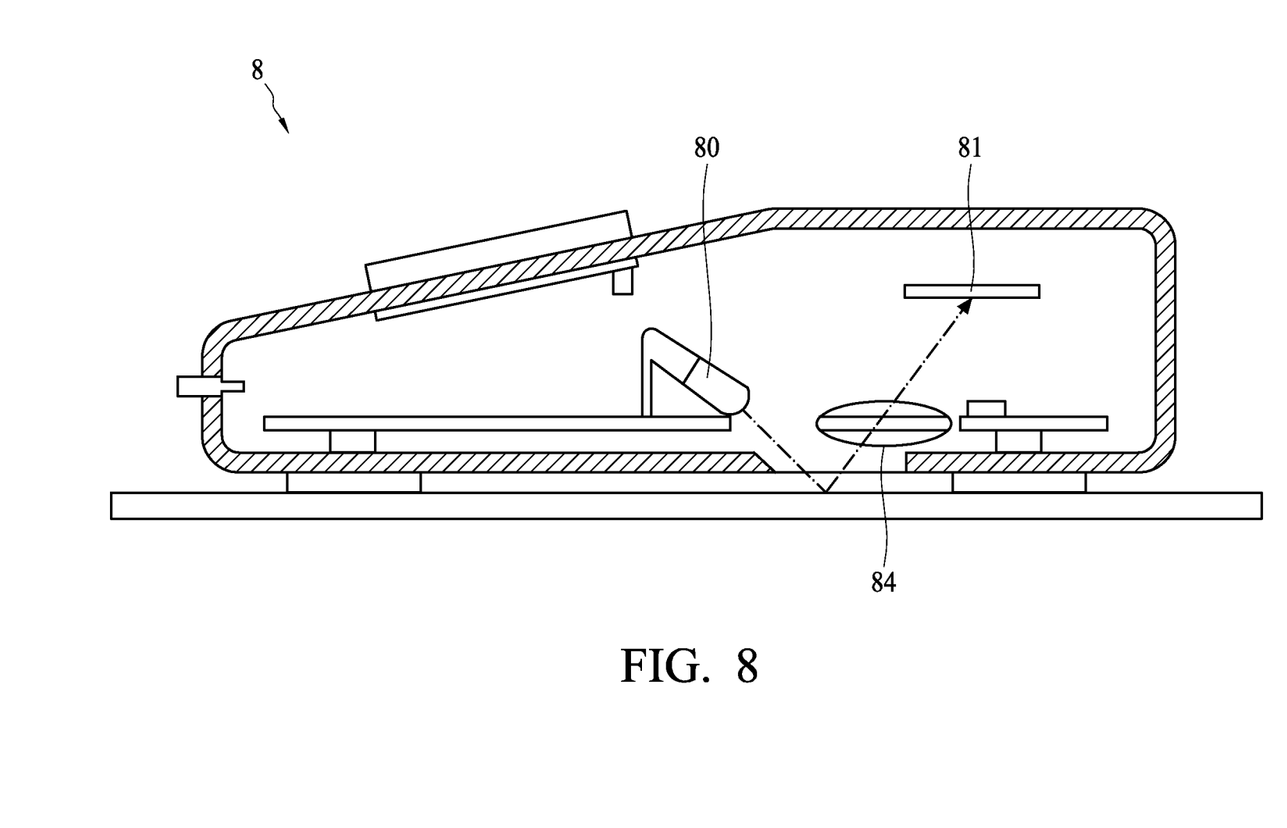
FIG. 8 is a cross-sectional view showing an optical navigation device according to one embodiment of the present invention.
Figure 9:
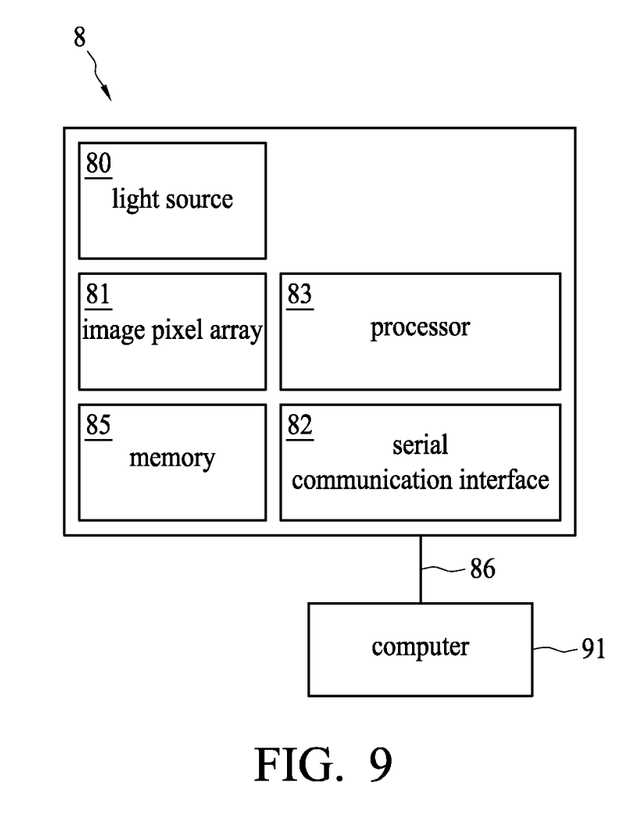
FIG. 9 is a block diagram of the optical navigation device.

FIG. 8 is a cross-sectional view showing an optical navigation device 8 according to one embodiment of the present invention. FIG. 9 is a block diagram of the optical navigation device 8. Referring to FIGS. 8 and 9, the optical navigation device 8 comprises a light source 80, an image pixel array 81, a serial communication interface 82, a processor 83, and a lens 84. The light source 80 is configured to shed light on a tracking surface, and the light beams are incident on the tracking surface at an angle. The lens 84 is configured to collect light reflected from the tracking surface and to form an image on the image pixel array 81. The image pixel array 81 is configured to provide the processor 83 with images and determine the positional change of at least one tracking feature of the images to continuously generate displacement or displacement data about the optical navigation device 8.

In one embodiment, the displacement data comprises first direction displacement data and second direction displacement data.

The optical navigation device 8 may further comprise a memory device 85 for storing the displacement data.

The serial communication interface 82 of the optical navigation device 8 can be used to communicate with a computer 91. The serial communication interface 82 may connect to a communication interface 86 and comprise a data transmission channel, wherein when the processor 83 is triggered, the processor 83 transmits displacement data to the computer 91 via the data transmission channel.

In one embodiment, if the communication interface 86 of the optical navigation device 8 is configured as being the transmission interface 4 of FIG. 4, then the communication interface 86 may further comprise a trigger channel. The computer 91 can send a trigger signal to the optical navigation device 8 via the trigger channel. After the optical navigation device 8 receives the trigger signal, the optical navigation device 8 may continuously sends displacement data to the computer 91. In one embodiment, when optical navigation device 8 receives a trigger signal, the optical navigation device 8 updates displacement data, and then continuously sends out the displacement data. Since the waiting time period from when the computer 91 sends out a trigger signal to when the computer 91 receives the displacement data is equivalent to the time period from when the optical navigation device 8 receives the trigger signal to when the optical navigation device 8 send out the displacement data, the optical navigation device 8 and the computer 91 are considered as being in synchronization. In one embodiment, after the optical navigation device 8 receives the trigger signal, the optical navigation device 8 is reset, adjusted to be synchronized with the computer 91, updates displacement data, and sends out the displacement data.

The optical navigation device 8 and the computer 91 are adapted to a predetermined data transmission protocol, by which readable data is directly transmitted between the optical navigation device 8 and the computer 91 without being accompanied by address data.

The trigger signal can be a low level signal or a high level signal for a specific period of time. The trigger signal is a predetermined protocol trigger signal that can be recognizable by the optical navigation device 8 and the computer 91. The signal width or the duration of the trigger signal can be shorten to the utmost, but still needs to be detectable by the optical navigation device 8. In other words, the signal width or the duration of the trigger signal can be at least the smallest pulse width that the optical navigation device 8 can still detect. The trigger signal may comprise a hardware trigger signal, or comprise an edge trigger signal or a level trigger signal.

The communication interface 86 may further comprise a clock change, through which the computer 91 issues clock signals. In one embodiment, the signal width of the clock signal of the optical navigation device 8 and the computer 91 can be the same as that of the trigger signal. In one embodiment, the signal width of the clock signal of the optical navigation device 8 and the computer 91 may be different from that of the trigger signal. In one embodiment, the signal width of the clock signal of the optical navigation device 8 and the computer 91 can be independently determined from that of the trigger signal, and the signal width of the clock signal is determined according to the system in use. The determination of the clock signal will not affect the application of the present invention. In one embodiment, the signal width of the clock signal of the optical navigation device 8 and the computer 91 is smaller than that of the trigger signal.

In another embodiment, the communication interface 86 of the optical navigation device 8 may be configured as being the transmission interface 6 as disclosed in FIG. 6. The communication interface 86 may comprise a data transmission channel and a clock channel. The computer 91 may hold the level of the clock channel to a certain signal level and change the signal level of the data transmission channel, thereby triggering the optical navigation device 8 to send readable data to the computer 91 via the data transmission channel. The optical navigation device 8 and the computer 91 are adapted to directly transmit the readable data by the predetermined data transmission protocol without simultaneously transmitting address data. In another embodiment, the clock channel can be held at a predetermined signal level for a period of time to trigger the optical navigation device 8 to send readable data to the computer 91 via the data transmission channel.

Figure 10:
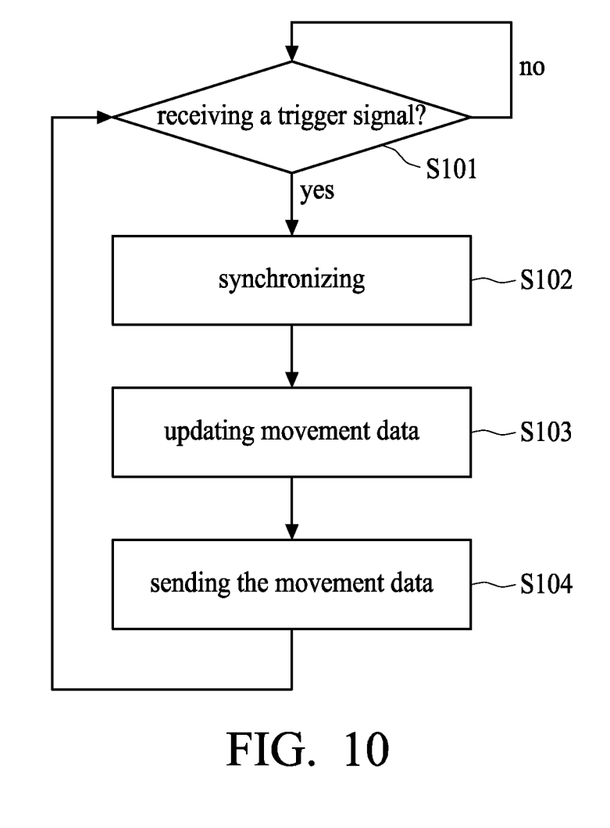
FIG. 10 is a flow chart demonstrating the procedure of a method for a quick burst motion readout mechanism.

FIG. 10 is a flow chart demonstrating the procedure of a method for a quick burst motion readout mechanism. In Step S101, a slave device verifies whether a trigger signal from a master device is received. If a trigger signal is received, the method proceeds from Step S101 to Step S102. In Step S102, the master device is synchronized with the slave device. In Step S103, the slave device updates displacement data. In Step S104, the slave device directly sends out displacement data, wherein the displacement data is not accompanied with address data related to the displacement data.

It will be apparent to those skilled in the art that various modifications can be made to the disclosed embodiments. It is intended that the specification and examples be considered as exemplary only, with the true scope of the disclosure being indicated by the following claims and their equivalents.

What is claimed is:

1. A transmission interface having a quick burst motion readout mechanism and configured to be applied between a master device and a slave device, the transmission interface comprising:
    a trigger channel configured to allow the master device to transmit a trigger signal to the slave device before transmission of data; and
    a data transmission channel configured to allow the slave device to transmit readable data to the master device after the slave device receives the trigger signal;
    wherein the master and slave devices are adapted to a predetermined data transmission protocol by which the readable data is directly transmitted and not accompanied by address data related to the readable data.

2. The transmission interface of claim 1, configured to be applied between an optical navigation device and a computer, wherein the readable data is displacement data, and wherein the optical navigation device is configured to transmit the displacement data after receiving the trigger signal from the computer.

3. The transmission interface of claim 2, wherein the displacement data comprises first direction displacement data and second direction displacement data.

4. The transmission interface of claim 2, wherein the trigger signal causes synchronization between the optical navigation device and the computer and updating of the displacement data.

5. The transmission interface of claim 1, wherein a signal width of the trigger signal is independently determined from a signal width of a clock signal provided for the mater device and the slave device.

6. The transmission interface of claim 1, wherein the trigger signal is a hardware trigger signal, or an edge trigger signal or a level trigger signal.

7. The transmission interface of claim 1, wherein the trigger signal is a predetermined protocol trigger signal, which is recognizable by the master device and the slave device.

8. A transmission interface having a quick burst motion readout mechanism and configured to be applied between a master device and a slave device, the transmission interface comprising a data transmission channel and a clock channel, wherein the slave device is configured to be triggered to send readable data to the master device via the data transmission channel when the clock channel is set at a signal level and a signal level of the data transmission channel is changed, wherein the master device and the slave device are adapted to a predetermined data transmission protocol, by which the readable data is directly transmitted and not accompanied by address data related to the readable data.

9. The transmission interface of claim 8, configured to be applied between an optical navigation device and a computer, wherein the readable data is displacement data, and wherein the optical navigation device is configured to transmit the displacement data after the optical navigation device is triggered.

10. The transmission interface of claim 9, wherein the displacement data comprises first direction displacement data and second direction displacement data.

11. The transmission interface of claim 9, wherein the trigger signal causes synchronization between the optical navigation device and the computer and updating of the displacement data.

12. The transmission interface of claim 8, wherein the trigger signal is a predetermined protocol trigger signal, which is recognizable by the master device and the slave device.

* * * * *